Jan. 27, 1970  T. E. HOLTON  3,491,800
FLEXIBLE CONDUIT CONNECTION
Filed Dec. 11, 1967
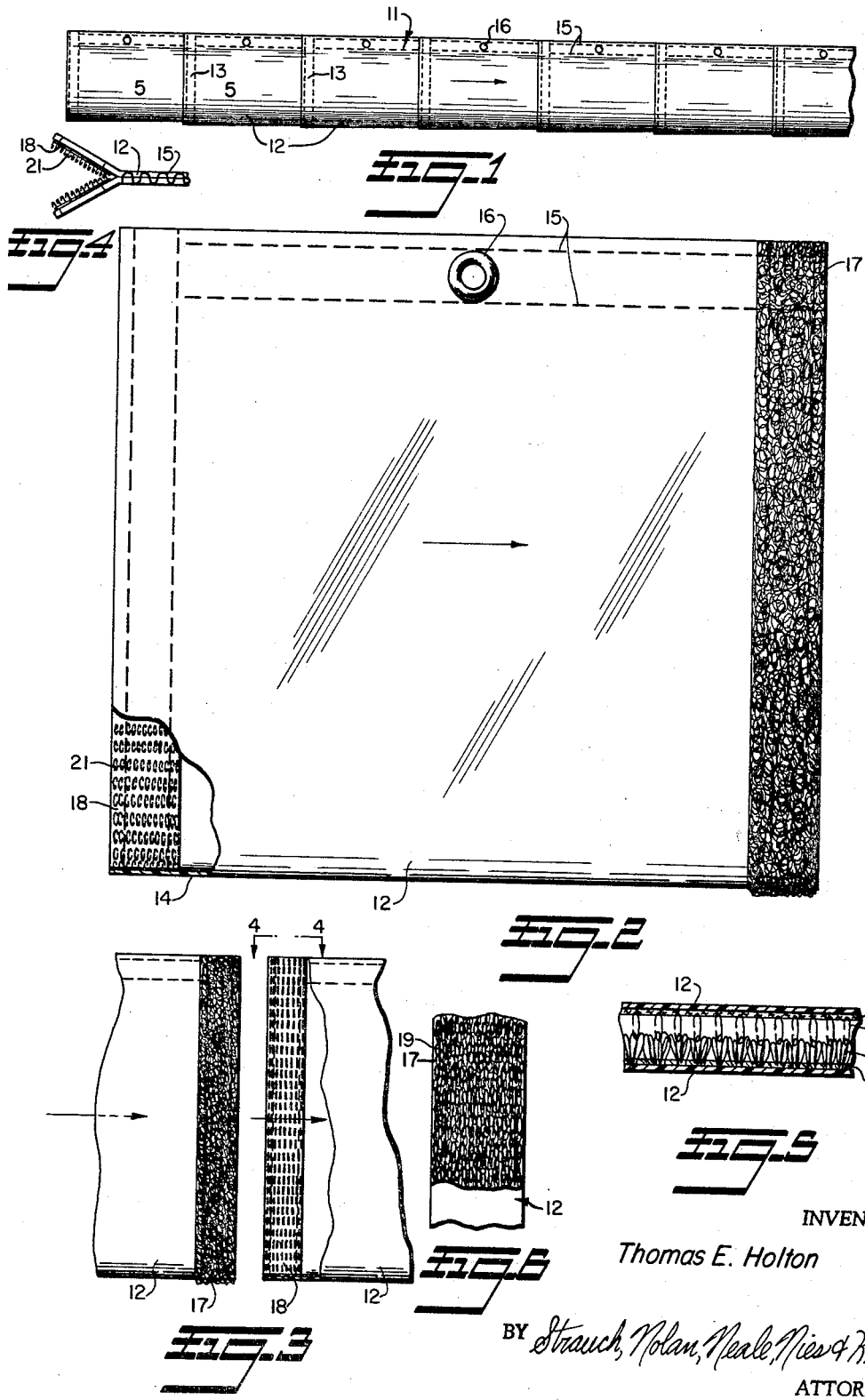
INVENTOR
Thomas E. Holton
BY
ATTORNEYS

United States Patent Office 3,491,800
Patented Jan. 27, 1970

3,491,800
FLEXIBLE CONDUIT CONNECTION
Thomas E. Holton, Broomfield, Colo., assignor to Supplies, Inc., Denver, Colo., a corporation of Colorado
Filed Dec. 11, 1967, Ser. No. 689,365
Int. Cl. F16l *11/04, 47/00*
U.S. Cl. 138—155                    7 Claims

ABSTRACT OF THE DISCLOSURE

A flexible conduit having particular advantage as mine vent tubing consists of longitudinal portions attached end to end to each other by a corrosion resistant flexible annular joint structure wherein telescoped separable fastener bands are mechanically joined to each other by contact under manual pressure, these bands being secured on the inside and outside respectively of each conduit portion, with one band comprising upstanding fabric loops and the other band comprising rows of stiff hooking elements for engaging the loops, and the joint being particularly resistant to separation by longitudinal pull.

BACKGROUND, FIELD AND SUMMARY OF INVENTION

Prior to the invention tubing such as used in mines for ventilation tubing usually consisted of lengths of flexible conduit joined end to end by relatively rigid hooplike metal joints which were not satisfactory in that they might be permanently restrictively deformed or even broken as when struck by heavy objects and were often disrupted as a result of prolonged vibration forces from the air source. Also these metal joint structures were expensive, required special seals and took time to assemble. Further, the metal often corroded when exposed to the severe mud and water conditions present in mines.

The invention seeks to remedy the foregoing difficulties by providing a special conduit tubing section flexible joint that is simple and easy to install and connect, is resistant to permanent deformation, is corrosion proof, is highly resistant to longitudinal separation and at the same time may be readily detached as for replacement of a damaged tubing section, and these are the major objects of the invention.

A further object of the invention is to provide a novel flexible joint between adjacent flexible conduit tube portions wherein bands of dry fabric material secured as by sewing onto the respective conduit section ends contain respectively projecting loops and hooks by which they are joined in telescoping relation under manual pressure.

BRIEF DESCRIPTION OF DRAWINGS

FIGURE 1 is a side elevation of a flexible conduit according to a preferred embodiment of the invention;

FIGURE 2 is an enlarged side elevation partly broken away and partly sectioned showing in detail one portion of conduit;

FIGURE 3 is an elevation illustrating the end to end interconnection of adjacent conduit portions;

FIGURE 4 is a fragmentary plan view on line 4—4 of FIGURE 3 showing longitudinal split in the joint end of one of the adjacent conduit portions;

FIGURE 5 is an enlarged diagrammatic section substantially on line 5—5 in FIGURE 1 showing the hook and loop engagements; and FIGURE 6 is a fragmentary side view showing the general orientation of the loops in the fabric strip.

PREFERRED EMBODIMENTS

FIGURE 1 shows a flexible conduit 11 adapted to be connected to a ventilation system in a mine. The conduit will be substantially inflated to approximately cylindrical form during operation. Conduit 11 is made up of a plurality of similar, preferably identical lengths or portions 12 which are secured to each other in a novel manner at annular flexible joints indicated at 13.

In practice each conduit portion 12 is fabricated from a sheet 14 of laminated twelve ounce nylon that has its opposite lateral sides double sewed together along a longitudinal seam joint 15, and each joint 15 may contain a metal eye 16 riveted therein to serve as for supporting the conduit on fasteners in the mine wall or roof.

In practice nylon sheets of varying size may be used. A desirable size range is such as would produce conduits when inflated about 8 to 36 inches in diameter, and each conduit portion would be about 25–100 feet in length depending on the circumstances. Eyes 16 may be on any desired spacing.

The flexible joints 13 are dry joints consisting of a separable fastener arrangement, readily attachable and separable and surprisingly adequately fluid tight. Each length of conduit 12 is provided at opposite ends with joint forming and attaching fabric strips 17 and 18 usually sewn thereto as illustrated.

Strip 17 is peripherally secured around the outside of the conduit portion at one end, and strip 18 is peripherally secured around the inner side of the conduit portion at the opposite end. Each of strips 17 and 18 is about one inch in width and, as each conduit portion 12 is attached to another in making up the conduit, the portions 12 overlap in telescoping relation at adjacent ends with strip 18 coextensively overlying strip 17.

Strips 17 and 18 are of special relative construction. Strip 17 is preferably a nylon fabric usually made on a velvet or like loom having an outer surface (see FIGURES 5 and 6) wherein the threads extend outwardly in closed flexible loops 19. Strip 17 will have a smooth soft surface feeling like plush or velvet.

Strip 18 on the other hand comprises a suitable woven or like nylon fabric containing longitudinally spaced lateral rows of projecting relatively stiff hooks 21 formed by supplementary warp threads of nylon or other heat settable plastic.

In assembly strip 18 is superposed onto strip 17 at each joint 13 and the two pressed together, as by finger pressure, with the result that hooks 21 become enmeshed with loops 19 over the coextensive band areas as diagrammatically shown in FIGURE 5.

With reference to FIGURE 2 it will be seen that hooks 21 are all so arranged in respective parallel rows that they lie in planes intersecting the longitudinal axis of the conduit at substantially right angles. I have found that the resultant joint, while relatively easy to assemble and separate by forces exerted generally radially of the conduit, is highly resistant to pulls longitudinally of the conduit and is strong enough to maintain connection under any normal condition of service encountered in mining operations.

For purposes of defining the invention, strip 17 will be referred to herein as the loop strip and strip 18 will be referred to herein as the hook strip. Strips 17 and 18 are preferably of the separable fastener forming type known by the trademark Velcro and described in U.S. Letters Patent No. 2,717,437, 3,009,235, 3,083,737 and 3,154,837 to which reference is made for further disclosure of the manufacture and composition of said strips.

In practice strip 18 is usually sewed on tightly throughout its length, but in each conduit portion 12 the longitudinal joint 15 terminates short of the end adjacent strip 18 to provide a longitudinal split through strip 18 (see FIGURE 4) to facilitate interfitting of the conduit portion ends, and to facilitate opening the joint as when it is desired to replace a damaged conduit portion.

The joint 13 is resistant to erosion and corrosion by mud and water and it reassumes its shape even when temporarily deformed. Preferred flow direction is shown by the arrows in FIGURES 1–3 so that flow will first encounter the closed inner edges of joint 13.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A flexible conduit comprising a plurality of longitudinal portions of flexible material connected by flexible transverse joints, each of said joints comprising overlapped fabric bands secured respectively to the inside and outside of adjacent conduit portion ends, one of said bands having flexible loops outstanding along its surface and the other having relatively stiff but flexible hooks adapted to mesh with said loops when the bands are pressed together to form the joint, and the conduit portion carrying the band inside thereof is formed with a longitudinal split extending through said inside band to facilitate assembly and disassembly.

2. The flexible conduit defined in claim 1, wherein each of said bands is composed of a material resistant to corrosion by water and the like.

3. The flexible conduit defined in claim 2, wherein said material is nylon.

4. The flexible conduit defined in claim 1, wherein said hooks are arranged in rows generally parallel to the conduit axis for improved resistance to longitudinal pull.

5. The flexible conduit defined in claim 1, wherein each overlap joint has its closed edge disposed to be first encountered by fluid flow through the conduit.

6. A flexible conduit section comprising a tube of nylon or like water resistant cloth having separable fastener bands at opposite ends, one of said bands being secured around the outer periphery of said tube and the other being secured around the inner side of said tube, the tube end having said other band secured around the inner side thereof being formed with a longitudinal split extending through said other band, and one of said bands having a multiplicity of flexible fabric loops distributed on its surface and the other having a multiplicity of relatively stiff non-metallic hooks distributed on its surface.

7. The flexible conduit defined in claim 6, wherein said hooks are arranged in parallel rows substantially parallel to the length of the tube.

References Cited

UNITED STATES PATENTS

| | | | |
|---|---|---|---|
| 1,211,067 | 1/1917 | Braly | 285—260 |
| 2,521,174 | 9/1950 | Kropp | 285—260 |
| 2,595,408 | 5/1952 | Quest | 285—260 |
| 3,009,235 | 11/1961 | Mestral | 26—2 |
| 3,128,476 | 4/1964 | Lash | 285—305 |
| 3,113,803 | 12/1963 | Struble | 24—204 X |
| 3,405,430 | 10/1968 | Sidelman | 24—204 |

FOREIGN PATENTS 970,698  9/1964  Great Britain.

HERBERT F. ROSS, Primary Examiner

U.S. Cl. X.R.

24—204; 138—120